Patented Mar. 19, 1929.

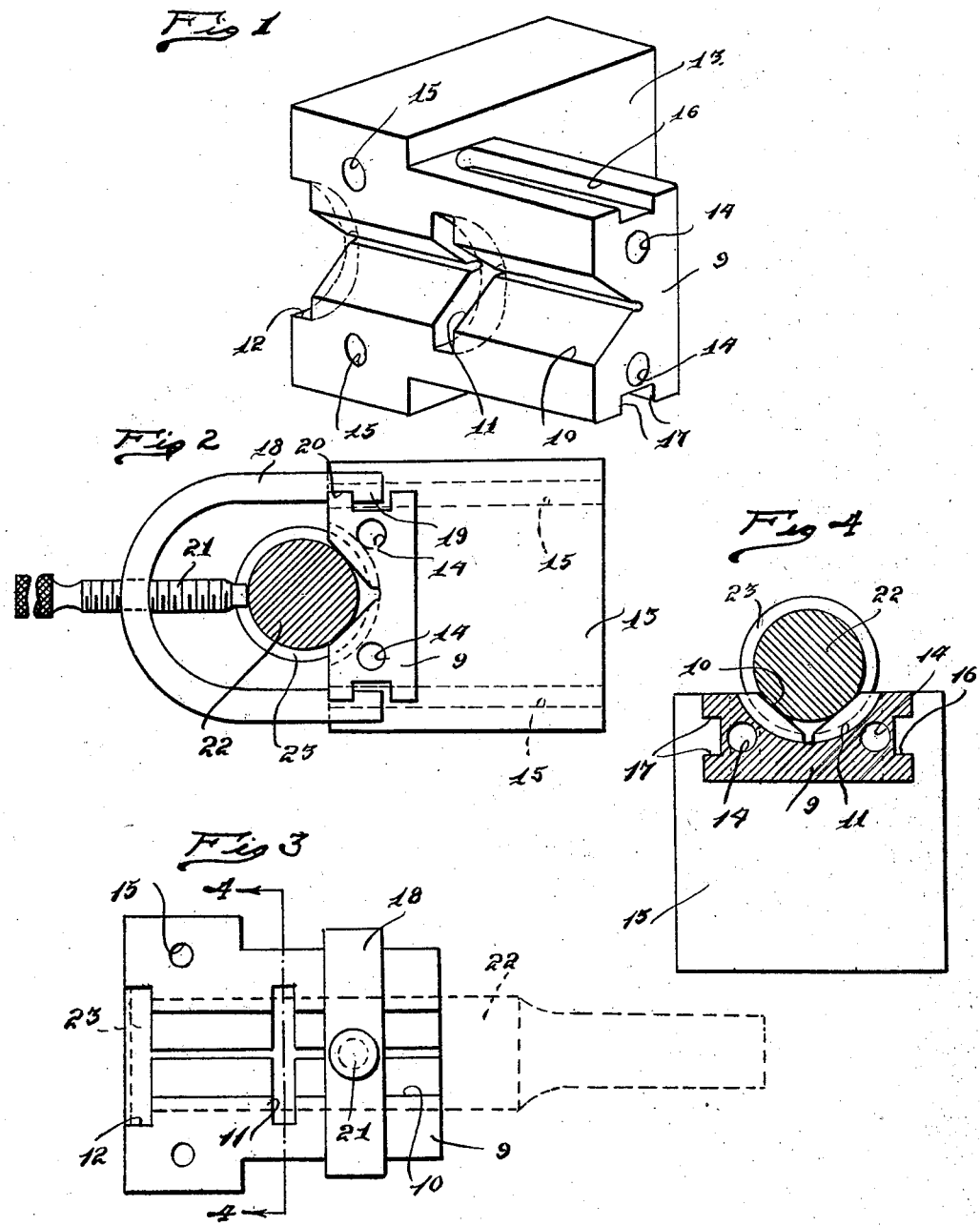

1,705,629

UNITED STATES PATENT OFFICE.

WILLIAM H. WILDBORE, OF FLINT, MICHIGAN.

V BLOCK AND ANGLE PLATE.

Application filed February 2, 1927. Serial No. 165,291.

My invention relates to a new useful improvement in a combination V-block and angle plate and has for its object the provision of a tool which may be utilized as a V-block or as an angle plate. In using an ordinary V-block the operator can work only on one side of the work-piece at one setting so that if it is desired to work on the work-piece on one side and then on another side, the operator is required to turn the work-piece around in the block and then reset it in the block. This operation requires the use of an indicator or square to get the sides parallel. In the present invention a V-block is provided whereby various sides of the work-piece may be worked upon at the one setting, it being but necessary to turn the block over on its side. This results partly from the formation of the block itself and particularly the V-groove formed therein, this groove leaving a large portion of the work-piece exposed.

To overcome the difficulties and disadvantages required from resetting and to provide a V-block whereby the work-piece may be worked upon on various sides at one setting is another object of the invention.

Another object of the invention is the provision in a V-block of this class of a plurality of grooves or recesses for accommodating flanges or projections on the work-piece.

Another object of the invention is the provision of a V-block of this class which will economize in labor over the ordinary V-block and which will render possible the performance of more accurate work.

Other objects will appear hereinafter.

The invention consists in the arrangement and combination of parts hereinafter described and claimed.

The invention will be best understood by a reference to the accompanying drawings which form a part of this specification and in which, Fig. 1 is a perspective view of the invention.

Fig. 2 is an end elevational view of the invention showing the work-piece in section.

Fig. 3 is a top-plan view of the invention.

Fig. 4 is a sectional view taken on line 4—4 of Fig. 3.

The invention comprises a V-block 9 having the longitudinally extending V-groove 10 formed therein, this groove 10 being interrupted intermediate its ends with the transversely extending groove 11. Formed at the end of the V-block transversely to the V-groove 10 is a recess 12. Projecting outwardly from the block 9 adjacent one end is a plate or block 13. Projected through the block 9 are openings 14 through which may be extended bolts or other fastening means whereby the block may be fastened to a bench or other supporting surface. Projected through the block 13 are openings 15 through which may engage screws or bolts for fastening purposes. Formed in the sides of the block 9 are longitudinally extending grooves 16 and 17. When it is desired to mount a work-piece 22 on the V-block, the work-piece is positioned as shown in Fig. 2 and Fig. 4. A clamping yoke 18 is provided with a notch 20 formed on the inner surface of each end to provide a portion 19 which engages in the grooves 16 and 17. Threaded in the yoke is a screw 21 which may be threaded downwardly into engagement with the work-piece 22 so as to securely clamp the work-piece on the block 9.

In the drawings, I have illustrated the work-piece 22 as provided with a flange 23 which rests in the recess 12. The groove 11 is also formed to accommodate such a flange or a peripheral projection on the work-piece.

As shown clearly in Fig. 2 and Fig. 4 a large portion of the work-piece 22 projects beyond the V-groove 10 and when the work-piece is clamped on the block 9 it is believed evident that this block may be placed in various positions so that various sides of the work-piece may be worked upon without requiring a re-setting of the work-piece. It is also believed evident that the block 13 mounted on the block 9 will provide a very efficient work-piece.

While I have illustrated and described the preferred form of construction, I do not wish to limit myself to the precise detail of construction shown but desire to avail myself of such variations and modifications as come within the scope of the appended claims.

Having thus described my invention what I claim as new and desire to secure by Letters Patent is:

1. A V-block of the class described comprising a block portion having a longitudinally extending groove formed in one face thereof and provided with a recess extending transversely thereof, said block having longitudinally extending grooves formed in opposite sides; and an additional block projecting outwardly from said block adjacent one end at right angles thereto; and means engageable in said oppositely positioned grooves for clamping a work-piece in said first mentioned groove.

2. A device of the class described comprising a block having a V-groove formed in one face and extending longitudinally thereof and provided along said groove with a recess for accommodating transversely extending flanges on a work-piece engaging in said groove.

3. In a device of the class described: a V-block having in one face a V-groove; and a block projecting outwardly from one end of said V-block at right angles thereto said block lying with one face flush with one face of said V-block and projecting beyond the other faces of said V-block.

In testimony whereof I have signed the foregoing specification.

WILLIAM H. WILDBORE.